US012704292B2

(12) United States Patent
Balaguru et al.

(10) Patent No.: US 12,704,292 B2
(45) Date of Patent: Aug. 11, 2026

(54) NOISE SUPPRESSION APPARATUS FOR AN AIR HANDLING UNIT

(71) Applicant: Johnson Controls Tyco IP Holdings LLP, Milwaukee, WI (US)

(72) Inventors: Rajavel Balaguru, New Cumberland, PA (US); Paul Francis Bauch, York, PA (US); Curtis Eichelberger, York, PA (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 223 days.

(21) Appl. No.: 18/208,781

(22) Filed: Jun. 12, 2023

(65) Prior Publication Data

US 2023/0400221 A1 Dec. 14, 2023

Related U.S. Application Data

(63) Continuation of application No. 16/848,579, filed on Apr. 14, 2020, now Pat. No. 11,674,716.

(51) Int. Cl.
*F24F 13/24* (2006.01)
*G10K 11/172* (2006.01)

(52) U.S. Cl.
CPC ............ *F24F 13/24* (2013.01); *G10K 11/172* (2013.01); *F24F 2013/245* (2013.01)

(58) Field of Classification Search
CPC ........ F24F 13/24; F24F 2013/245; F24F 1/40; F01N 1/023; G10K 11/172
See application file for complete search history.

(56) References Cited

U.S. PATENT DOCUMENTS 3,920,095 A * 11/1975 Clark ...................... F16L 55/02 181/248
4,432,434 A 2/1984 Dean, Jr.
(Continued)

FOREIGN PATENT DOCUMENTS

EP 619461 A1 10/1994
EP 2602561 A1 6/2013
(Continued)

OTHER PUBLICATIONS

WO-2014006650-A1 Translation (Year: 2014).*
(Continued)

*Primary Examiner* — David J Teitelbaum
(74) *Attorney, Agent, or Firm* — Fletcher Yoder, P.C.

(57) ABSTRACT

A noise suppression apparatus for an air handling unit includes an inlet section connectable to a fan of the air handling unit. The inlet section includes a forward wall spaced apart from an aft wall to define an internal chamber, and an inlet wall extending between the forward wall and the aft wall, the inlet wall defining an inlet air opening. A plurality of internal walls in the inlet wall define a plurality of resonator openings that each open to at least one of a plurality of resonator sections within the internal chamber. The plurality of resonator sections include at least one quarter wave tube section and at least one Helmholtz resonator section. One or more resonator sections are configured to attenuate noise generated by the fan at two or more frequencies. At least one resonator opening of the plurality of resonator openings opens to a plurality of resonator sections.

20 Claims, 6 Drawing Sheets

(56) References Cited

U.S. PATENT DOCUMENTS

| | | | | | |
|---|---|---|---|---|---|
| 4,850,093 | A | | 7/1989 | Parente | |
| 5,268,541 | A | | 12/1993 | Pettersson | |
| 5,326,317 | A | * | 7/1994 | Ishizu | F04D 29/665<br>454/906 |
| 5,493,080 | A | * | 2/1996 | Moss | F01N 13/02<br>181/227 |
| 5,869,792 | A | * | 2/1999 | Allen | F16L 55/0333<br>181/224 |
| 6,102,153 | A | | 8/2000 | Willke, Jr. | |
| 6,419,576 | B1 | | 7/2002 | Han | |
| 7,891,464 | B2 | | 2/2011 | Tang et al. | |
| 7,992,674 | B2 | | 8/2011 | Gorny et al. | |
| 8,025,477 | B2 | | 9/2011 | Ganesh et al. | |
| 9,791,166 | B2 | * | 10/2017 | Rainey | F24F 13/24 |
| 9,872,104 | B2 | | 1/2018 | Hopkins | |
| 2014/0271134 | A1 | | 9/2014 | Le Roy et al. | |
| 2015/0369514 | A1 | | 12/2015 | Groskreutz et al. | |
| 2018/0135654 | A1 | | 5/2018 | Ting | |
| 2022/0357075 | A1 | * | 11/2022 | Hakuta | G10K 11/175 |

FOREIGN PATENT DOCUMENTS

| | | | | | |
|---|---|---|---|---|---|
| EP | 2980500 | A1 | | 2/2016 | |
| WO | WO-2014006650 | A1 | * | 1/2014 | F04D 25/166 |

OTHER PUBLICATIONS

Arenas, et al. "Use of resonators for practical noise reduction" 38th International Congress and Exposition on Noise Control Engineering 2009, Inter-Noise 2009. 2. 1102-1109.

* cited by examiner

NOISE SUPPRESSION APPARATUS FOR AN AIR HANDLING UNIT

CROSS-REFERENCE TO RELATED APPLICATIONS

This is a continuation application of U.S. patent application Ser. No. 16/848,579, entitled "NOISE SUPPRESSION APPARATUS FOR AN AIR HANDLING UNIT," filed Apr. 14, 2020, which is hereby incorporated by reference in its entirety for all purposes.

TECHNICAL FIELD

The present disclosure relates generally to air handling systems and specifically to a noise suppression apparatus for an air handling unit.

BACKGROUND

All air handling units in heating, ventilation and air conditioning (HVAC) systems may include one or more types of fans, such as belt drive and direct drive plenum fans in an air handling unit (AHU). Plenum fans are centrifugal fans that produce prominent blade pass frequency noise which is identified as a major drawback for these types of fans. The blade pass frequencies of the fans may be pure tones or discrete frequencies that are difficult to mitigate, and are the primary source of annoyance to an end user.

SUMMARY

The present disclosure includes various implementations of an apparatus that enables attenuation or suppression of noise in an air handling unit. In an implementation, the noise suppression apparatus as described herein includes an inlet section connectable to a fan of the air handling unit, the inlet section including a forward wall spaced apart from an aft wall to define an internal chamber. The inlet section includes an inlet wall extending between the forward wall and the aft wall, the inlet wall defining an inlet air opening through the inlet section that is configured to receive air for the fan. A plurality of internal walls in the inlet wall define a plurality of resonator openings that each open to at least one of a plurality of resonator sections within the internal chamber. The plurality of resonator sections include at least one quarter wave tube section and at least one Helmholtz resonator section. At least one of the plurality of resonator sections is configured to attenuate noise generated by the fan at two or more frequencies, and at least one resonator opening of the plurality of resonator openings opens to a plurality of resonator sections. The quarter wave tube section is configured to attenuate the noise generated by the fan at a first frequency, and the Helmholtz resonator section is configured to attenuate the noise generated by the fan at a second frequency different from the first frequency. The first frequency, attenuated by the quarter wave tube section, may be adjacent to the second frequency, attenuated by the Helmholtz resonator section, to create a broad range of frequencies that may be attenuated by the noise suppression apparatus.

DETAILED DESCRIPTION

A noise suppression apparatus for an AHU which is integrated with a plenum fan within the AHU can attenuate or suppress a noise at discrete frequencies (tonal noise) or a range of tonal frequencies on the suction side of the air handling system. The tonal frequency may be targeted such as to reduce a fan blade-pass frequency noise on the suction side of the air handling fan system.

The noise suppression apparatus (hereinafter also referred to as "inlet silencer") of the present application is advantageous as it is passive and targets one or more specific frequencies without requiring significant space and/or structure on the suction side, which may be a drawback of other noise reduction solutions. The noise suppression apparatus of the present application is also advantageous in its ability to efficiently attenuate or suppress one or more frequencies, as the inlet silencer is placed close to the sound source (i.e., the plenum fan). The noise suppression apparatus will target the blade tones at the suction side of the fan and thus effectively improve the noise characteristics with minimal additional footprint in the return air side of the AHU. In an aspect, the present disclosure provides a noise suppression apparatus that includes at least two different types of resonators, e.g., a quarter wave tube resonator and a Helmholtz resonator, each tuned to a different frequency to effectively create a range of frequencies between the two tuned frequencies in which the noise suppression apparatus can attenuate noise, such as when the two tuned frequencies are relatively close.

In an implementation, the noise suppression apparatus may include one or more combinations of different types of resonators, such as a quarter wave tube and a Helmholtz resonator, which work in combination to attenuate or suppress one or more frequencies or ranges of frequencies of noise produced by a fan, such as corresponding to one or more blade pass frequencies. For example, a first frequency, attenuated by the quarter wave tube, may be adjacent to a second frequency, attenuated by the Helmholtz resonator, to support a broad range of frequencies that may be attenuated or suppressed by the noise suppression apparatus. The broad range of frequencies can effectively increase attenuation capabilities of the noise suppression apparatus which are advantageous over a stand-alone quarter wave tube resonator or a stand-alone Helmholtz resonator.

Figure 1:
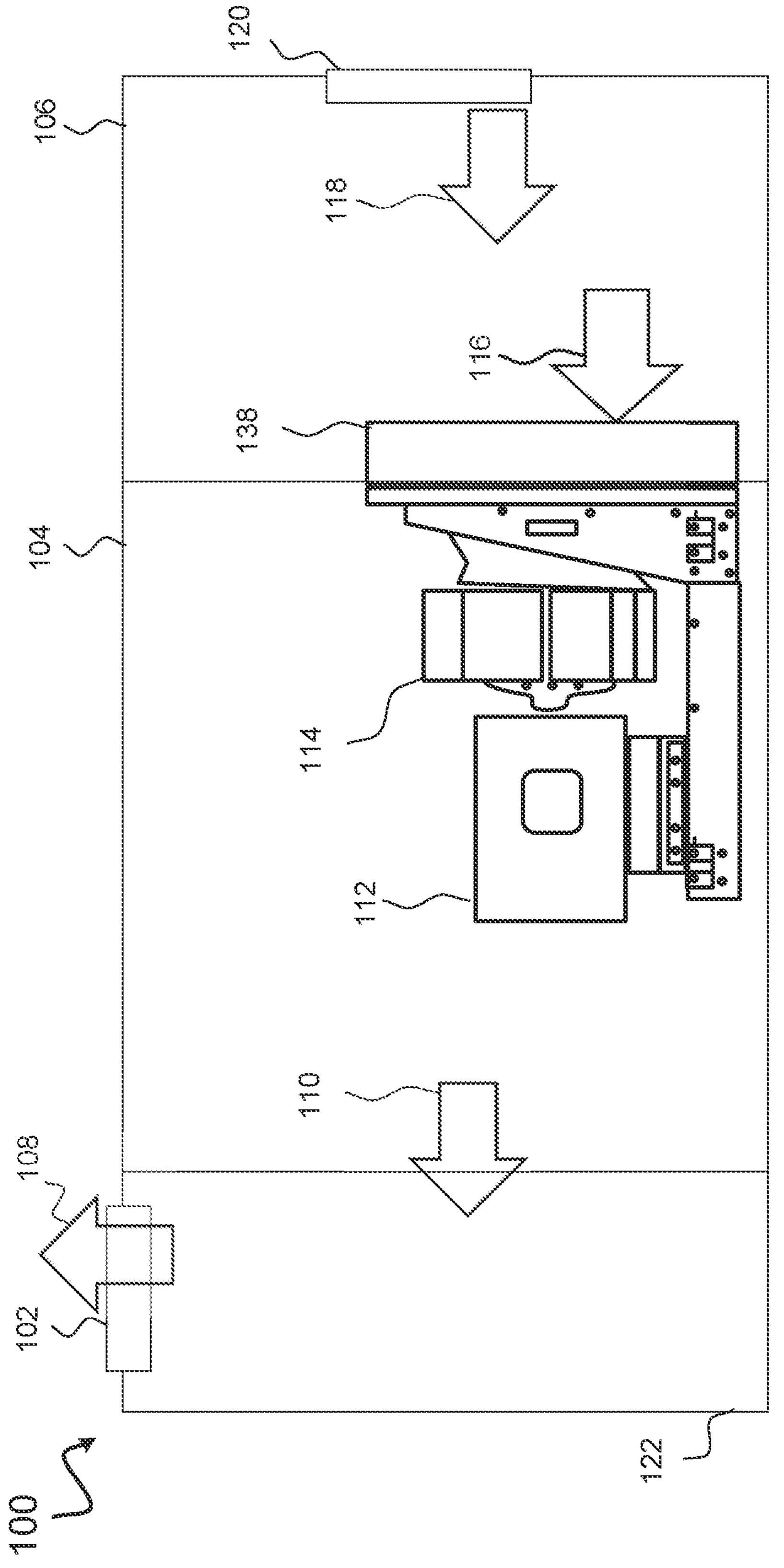
FIG. 1 is a schematic diagram of an AHU including an inlet-mounted noise suppression apparatus according to the present application.

Referring to FIG. 1, an AHU 100 includes an inlet plenum section 106 having an inlet opening 120 for inlet of air into the AHU 100. The air entering the inlet opening 120 flows towards a fan segment section 104 as illustrated by arrows 118 and 116. The fan segment section 104 includes a fan assembly 114 (which may include a plenum fan) and a motor 112 for rotating the fan. Additional sections of the AHU 100 (e.g., an air filter section, etc.) may be located between the inlet plenum section 106 and the fan assembly 114. An inlet silencer 138, also referred to herein as a noise suppression apparatus, may be integrated with the fan assembly 114 on the air inlet side of the plenum fan or fan assembly 114. The air entering the fan segment section 104 as illustrated by the arrow 116 enters the fan assembly 114 and hence the plenum fan by passing through the inlet silencer 138. The inlet silencer 138 may include a plurality of resonator openings that open into a plurality of resonator sections, with each of the plurality of resonator sections including a Helmholtz resonator section and one or more quarter wave tube sections (as described below in different implementations of the inlet silencer 138 in FIGS. 2A, 2B, 3A, 3B, 4A, 4B, 5A, 5B, 6A and 6B).

Each of the quarter wave tube section(s) may be configured to attenuate noise generated by the plenum fan at a particular frequency. Sound passing through the inlet silencer 138 may interact with a resonator opening of a quarter wave tube section(s). For instance, noise generated by the plenum fan at a first frequency may be attenuated by the quarter wave tube section(s). For example, the first frequency ($f_{QWT}$, which also represents a Quarter wave tube resonance frequency (in Hertz (Hz))) of the noise that a quarter wave tube section may be configured to attenuate may be:

$$f_{QWT} = \frac{c_{air}}{4L_{Eq,QT}};$$

where, $C_{air}$=speed of sound in air (in meters per second), and $L_{Eq,QT}$=Equivalent length of a quarter wave tube (in meters (m)) further described below.

Additionally, sound passing through the inlet silencer 138 may also interact with the opening of a Helmholtz resonator section. Noise generated by the plenum fan at a second frequency may be attenuated by the Helmholtz resonator section. For example, the second frequency (or $f_{HR}$, which also represents a Helmholtz resonator frequency (in Hz)) of the noise that the Helmholtz resonator section may be configured to attenuate may be:

$$f_{HR} = \frac{C_{air}}{2\pi}\sqrt{\frac{A_{HR}}{V_{HR}L_{Eq}}};$$

where, $A_{HR}$=Area of Helmholtz opening (in square meters), $V_{HR}$=Volume of the Helmholtz resonator cavity (in cubic meters), and $L_{Eq}$=Equivalent length (m).

Also, $A_{HR}=W_{HR}*d_{HR}$; where, $W_{HR}$=Width of the Helmholtz opening (m), and $d_{HR}$=Depth of the Helmholtz opening (m). Further, $L_{Eq}=L_{HR}+0.85\ d_H$; where, $L_{HR}$=Length of the Helmholtz opening (m), and $d_H$=Hydraulic diameter of the Helmholtz opening (m), with $$d_H = \frac{2*W_{HR}*d_{HR}}{W_{HR}+d_{HR}}.$$

Moreover, $L_{Eq,QT}=L_{QT}+0.3\ d_{H,QT}$; where $L_{QT}$=Length of the quarter wave tube (m), and $d_{H,QT}$=Hydraulic diameter of the quarter wave tube (m), with $$d_{H,QT} = \frac{2*W_{QT}*d_{HR}}{W_{QT}+d_{HR}};$$

where $W_{QT}$=Width of the quarter wave tube (m). The parameters 0.85 $d_H$ and 0.3 $d_{H,\ QT}$ used in above equations are empirical acoustic end-corrections used to more accurately predict the resonance frequency of Helmholtz and Quarter wave tubes. The hydraulic diameter may be used for non-circular openings and for circular openings it may be the diameter of the opening. The values 0.85 and 0.3 are may only be used as a design choice when the openings are rectangular and the values may change when other shapes (e.g., circular, trapezoidal, or other similar shapes) are used for the opening.

It should be noted that the first frequency attenuated by a respective quarter wave tube section may be the same frequency or a different frequency as the second frequency attenuated by a respective Helmholtz resonator section. Moreover, if there are more than one quarter wave tube section combined with a Helmholtz resonator section, then the two or more quarter wave tube sections may attenuate two or more different frequencies, where one of those frequencies may or may not be the same as the second frequency attenuated by the Helmholtz resonator section. Such a design can effectively increase the range of frequencies attenuated by the noise suppression apparatus.

In some implementations of the inlet silencer 138, the quarter wave tube section(s) and the Helmholtz resonator section may be adjacent to one another and share a common opening to the air passing through the inlet silencer 138, e.g., a resonator opening may be immediately adjacent to a Helmholtz resonator section and further away from a quarter wave tube section(s) of a resonator section (as described below). In another implementation of the inlet silencer 138, the quarter wave tube section and the Helmholtz resonator section may be adjacent to one another and similarly both adjacent to the opening, e.g., the resonator opening(s) for each of the Helmholtz resonator section and the quarter wave tube section are each open to the air passing through the inlet silencer 138 (as described below in FIGS. 3A and 3B).

The AHU 100 may also include a discharge plenum section 122 having a discharge opening 102. The air from the fan assembly 114 enters the discharge plenum section 122 as shown by an arrow 110. Additional sections of the AHU 100 (e.g., an air filter section, etc.) may be located between the discharge plenum section 122 and the fan assembly 114. The air in the discharge plenum section 122 may exit the AHU 100 from the discharge opening 102 as indicated by the arrow 108.

Figure 2B:
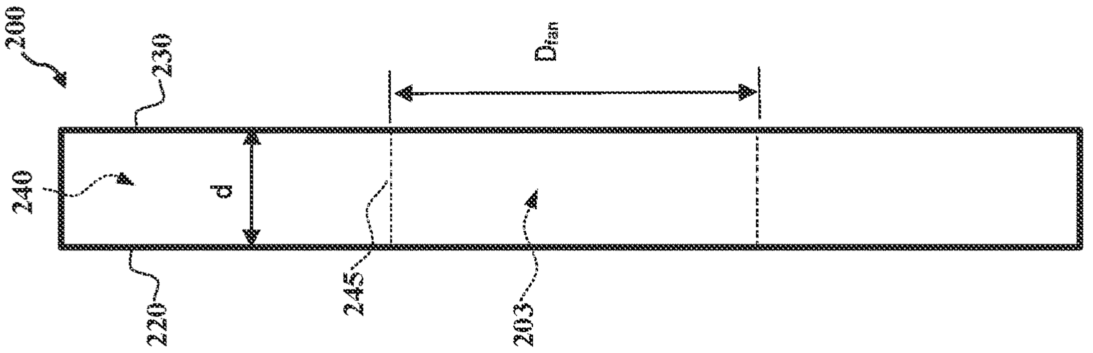
FIGS. 2A and 2B are a front view and a side view, respectively, of an example implementation of a noise suppression apparatus for an AHU, where a forward wall in the front view is removed to expose the internal structure.
Figure 2A:
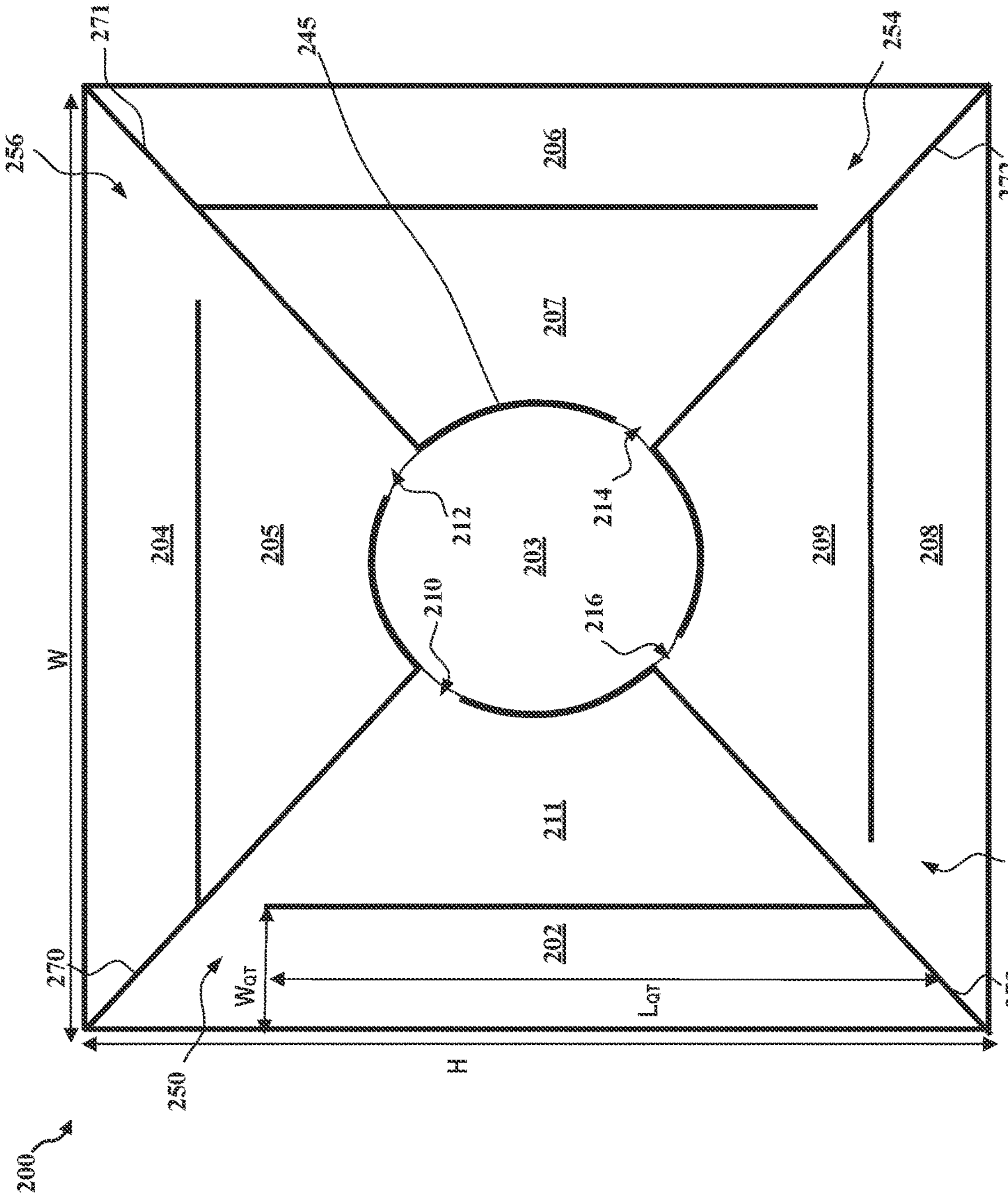

Referring to FIGS. 2A and 2B, an example noise suppression apparatus 200 (i.e., the inlet silencer 138 as described above in FIG. 1) for the AHU 100 includes a plurality of resonator sections that each include a combination of Helmholtz resonators and quarter wave tube resonators that share a common opening to an inlet air opening 203 that extends through the noise suppression apparatus 200. The noise suppression apparatus 200 may have dimensions, H×W×d (length×width×depth), where H may represent height (e.g., in meters) of the inlet silencer 138 (as described above with reference to FIG. 1) and W may represent width (e.g., in meters) of the inlet silencer, and d may represent depth (e.g., in meters) of the inlet silencer.

The noise suppression apparatus 200 may include a forward wall 220 spaced apart from an aft wall 230 to define an internal chamber 240 that includes a plurality of resonator sections, such as but not limited to resonator sections 250, 252, 254 and 256. The noise suppression apparatus 200 may also include an inlet wall 245 extending between the forward wall 220 and the aft wall, such that the inlet wall 245 defines an inlet air opening 203 extending through the noise suppression apparatus 200. The inlet air opening 203 may be circular in cross section and may be configured to receive air for the plenum fan. The inlet air opening 203 may have a diameter of $D_{fan}$ (e.g., in meters), where $D_{fan}$ may also represent an inlet diameter of the plenum fan. The inlet wall 245 may also include a plurality of internal walls defining a plurality of resonator openings 210, 212, 214 and 216 that each respectively open to one of the resonator sections 250, 252, 254 and 256. Also, a plurality of side-walls 270, 271, 272 and 273 extending between the forward wall 220 and the aft wall 230 may further define the resonator sections 250, 252, 254 and 256 with the resonator openings 210, 212, 214 and 216 being closer to one of the side-walls 270, 271, 272 and 273, respectively, which define each resonator section. More specifically, the resonator section 250 may include a Helmholtz resonator section 211 immediately adjacent to the resonator opening 210, and a quarter wave tube section 202 positioned on the other side of and in communication with the Helmholtz resonator section 211. The quarter wave tube section 202, may have a length, $L_{QT}$, and a width, $W_{QT}$, and open into the Helmholtz resonator section 211, where the opening may align with the resonator opening 210. The quarter wave tube section 202 may attenuate noise generated by the plenum fan at a first frequency ($f_{QWT}$, as described above with reference to FIG. 1). The Helmholtz resonator section 211 may have an area, $A_{HR}=W_{HR}*d_{HR}$; where, $W_{HR}$ may be the width of the resonator opening 210, and $d_{HR}$ may be as described above. In one implementation, as illustrated in FIG. 2A, the length of the resonator opening ($L_{HR}$, as described above with reference to FIG. 1) may have a value of zero or nearly zero. The Helmholtz resonator section 211 may attenuate noise generated by the plenum fan at a second frequency ($f_{HR}$), as described using formulas above in FIG. 1 description.

Similarly, the resonator section 256 may include a Helmholtz resonator section 205 and a quarter wave tube section 204, the resonator section 254 may include a Helmholtz resonator section 207 and a quarter wave tube section 206, and the resonator section 252 may include a Helmholtz resonator section 209 and a quarter wave tube section 208. In one implementation, the resonator sections 256, 254 and 252 may be similar in structure and noise attenuation characteristics to the resonator section 250. For example, the dimensions of the Helmholtz resonator sections 205, 207 and 209 in the respective resonator sections 256, 254 and 252 may be the same as the dimensions of the Helmholtz resonator section 211 in the resonator section 250. Further, the dimensions of the quarter wave tube sections 204, 206 and 208 in the respective resonator sections 256, 254 and 252 may be the same as the dimensions of the quarter wave tube section 202 in the resonator section 250. With same dimensions, the quarter wave tube sections 202, 204, 206 and 208 may attenuate noise generated by the plenum fan at the same first frequency (e.g., $f_{QWT}$, as described above with reference to FIG. 1). Similarly, the Helmholtz resonator sections 205, 207 and 209, may attenuate noise generated by the plenum fan at the same second frequency (e.g., $f_{HR}$, as described above with reference to FIG. 1).

In another implementation, one or more of the resonator sections 256, 254 and 252 may be sized or configured differently from the resonator section 250, and may be further different from each other in structure and noise attenuation characteristics. For example, the dimensions of the Helmholtz resonator section 211 may be different from the dimensions of one or more of the Helmholtz resonator sections 205, 207 and 209. In one example, the Helmholtz resonator section 205 of the resonator section may attenuate noise at a different frequency than one or more of the Helmholtz resonator sections 207, 209 and 211. Further, dimensions of the quarter wave tube section 204 (e.g., length, width, as described above) may be different from the dimensions of one or more of the quarter wave tube sections 202, 206 and 208. The quarter wave tube section 204 of the resonator section 256 may attenuate noise at a different frequency than one or more of the quarter wave tube sections 207, 209 and 211.

Thus, the dimensions of the Helmholtz resonator sections 205, 207, 209 and 211, and the quarter wave tube sections 204, 206, 208 and 208, in the resonator sections 256, 254, 252 and 250, respectively, may be chosen based on desired noise attenuation characteristics (e.g., a number of different noise frequencies, or a range of noise frequencies to be attenuated) of the noise suppression apparatus 200.

Figure 3B:
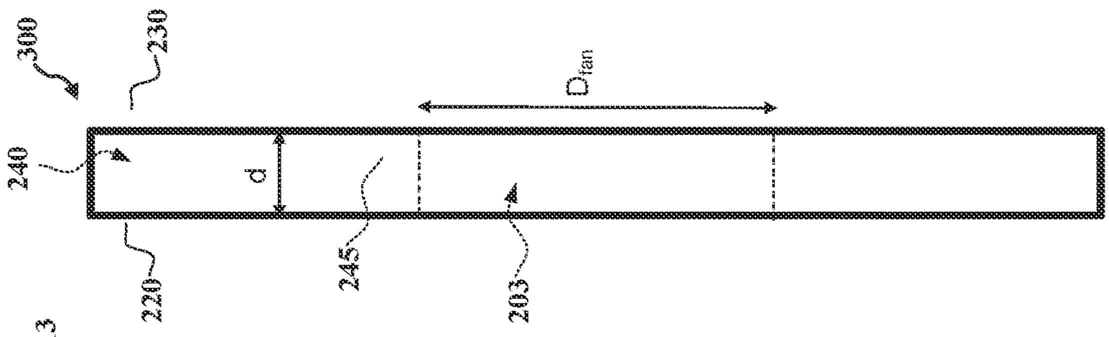
FIGS. 3A and 3B are a front view and a side view, respectively, of an example implementation of a noise suppression apparatus for an AHU, where a forward wall in the front view is removed to expose the internal structure.
Figure 3A:
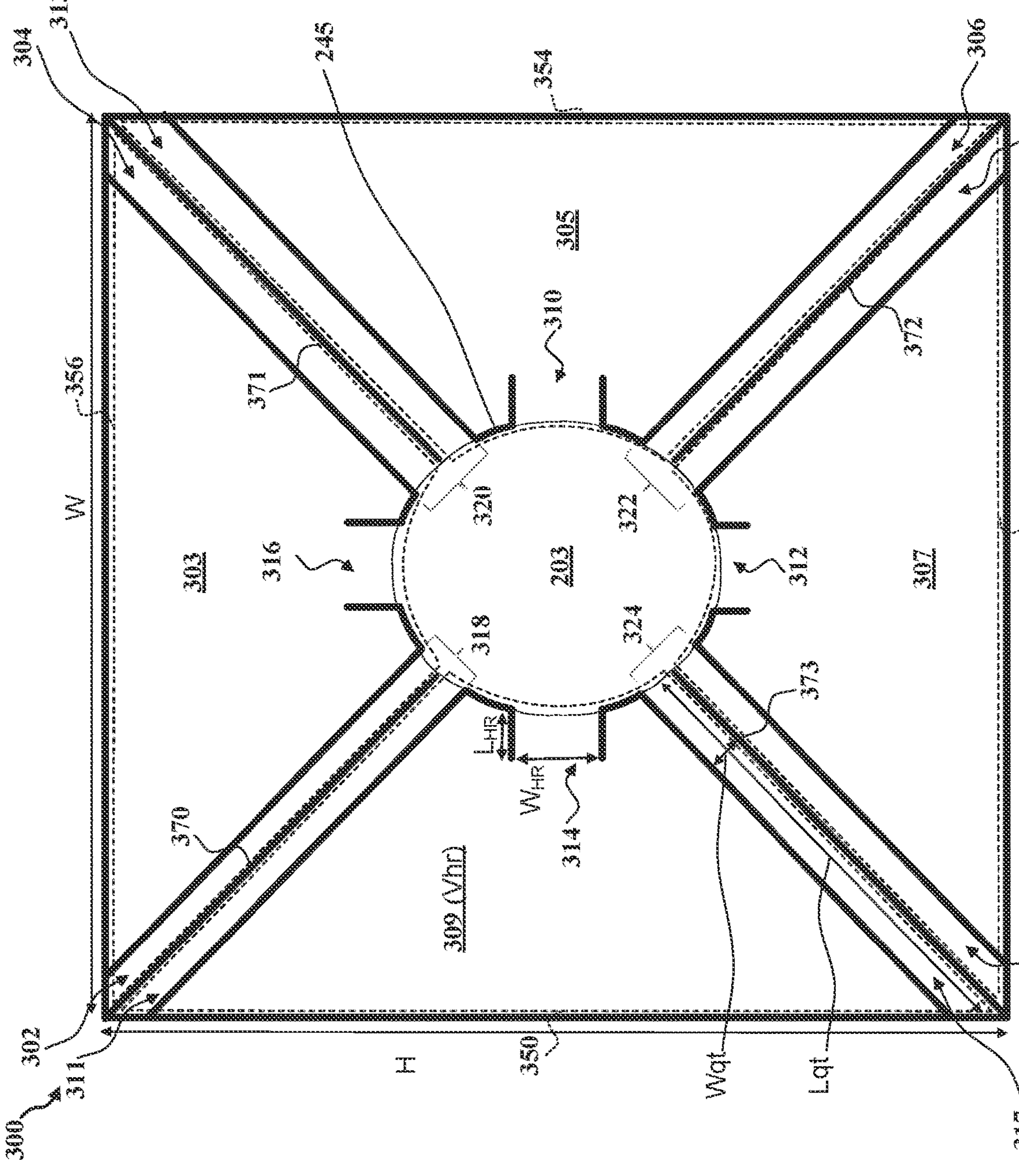

Referring to FIGS. 3A and 3B, another example noise suppression apparatus 300 (i.e., the inlet silencer 138 as described above in FIG. 1) includes a plurality of resonator sections that each include a combination of a Helmholtz resonator and at least two quarter wave tube resonators that have adjacent openings to an inlet air opening 203 that extends through the noise suppression apparatus 200. The noise suppression apparatus 300 may have dimensions, H×W×d (as described above with reference to FIG. 2A).

The noise suppression apparatus 300 may include the forward wall 220 spaced apart from the aft wall 230 to define an internal chamber 240 having a plurality of resonator sections, such as but not limited to resonator sections 350, 352, 354 and 356. The noise suppression apparatus 300 may also include an inlet wall 245 and the aft wall 230 which define the inlet air opening 203 (as described above with reference to FIG. 2A). The inlet air opening 203 may be circular in cross-section and may be configured to receive air for the plenum fan. The inlet air opening 203 may have a diameter of $D_{fan}$ (e.g., in meters), where $D_{fan}$ may also represent an inlet diameter of the plenum fan. The noise suppression apparatus 300 may also include a plurality of internal walls in the inlet wall 245 defining a plurality of resonator openings 314, 318, 316, 320, 310, 322, 312 and 324. Also, a plurality of side-walls 370, 371, 372 and 373 extending between the forward wall 220 and the aft wall 230 may further define the resonator sections 350, 352, 354 and 356, respectively.

The resonator openings 314, 318 and 324 may open into the resonator section 350. More specifically, the resonator section 350 may include a Helmholtz resonator section 309 (with a volume Vhr), a quarter wave tube section 311 and a quarter wave tube section 317. The quarter wave tube section 311 and the quarter wave tube section 317 may be formed along opposite sides of the Helmholtz resonator section 309 and extend through the noise suppression apparatus 200. The resonator openings 318 and 324 may be adjacent to the inlet air opening 203. The resonant opening 318 may open into the quarter wave tube section 311, and the resonant opening 324 may open into the quarter wave tube section 317. The quarter wave tube section 317, may have a length, $L_{QT}$, and a width, $W_{QT}$. The quarter wave tube section 317 may attenuate noise generated by the plenum fan at a first frequency ($f_{QWT}$, as described above with corresponding formulas in FIG. 1 description). The resonator opening 314 may open into the Helmholtz resonator section 309. The resonator opening 314 may have an area, $A_{HR}=W_{HR}*d_{HR}$; where, $W_{HR}$ may be the width of the resonator opening 314, and $d_{HR}$ may the depth of the resonator opening 314. Also the resonator opening 314 may have a length $L_{HR}$. The Helmholtz resonator section 309 may attenuate noise generated by the plenum fan at a second frequency ($f_{HR}$, as described above with corresponding formulas in FIG. 1 description).

Similar to the resonator section 350, the resonator section 356 may include a quarter wave tube section 302, a quarter wave tube section 304 and a Helmholtz resonator section 303. The resonator opening 318 may open into the quarter wave tube section 302, and the resonator opening 320 may open into the quarter wave tube section 304. The resonator opening 316 may open into the Helmholtz resonator section 303. Further, similar to the resonator section 350, the resonator section 354 may include a quarter wave tube section 313, a quarter wave tube section 306 and a Helmholtz resonator section 305. The resonator opening 320 may open into the quarter wave tube section 313, and the resonator opening 322 may open into the quarter wave tube section 306. The resonator opening 310 may open into the Helmholtz resonator section 305. Also, similar to the resonator section 350, the resonator section 352 may include a quarter wave tube section 315, a quarter wave tube section 308 and a Helmholtz resonator section 307. The resonator opening 322 may open into the quarter wave tube section 315, and the resonator opening 324 may open into the quarter wave tube section 308. The resonator opening 312 may open into the Helmholtz resonator section 307.

In one implementation, the dimensions of the Helmholtz resonator openings 316, 310 and 312 in the respective resonator sections 356, 354 and 352 may be the same as the dimensions of the Helmholtz resonator opening 314 in the resonator section 350. Also, the dimensions (e.g., length and width) of the quarter wave tube section 311 may be the same as the dimensions of the quarter wave tube section 317 ($L_{QT}$ and $W_{QT}$ as described above). Further, the dimensions of the quarter wave tube sections 302, 304; 306, 313; 315, 308; in the respective resonator sections 356, 354 and 352 may be the same as the dimensions of the quarter wave tube sections 311 and 317 in the resonator section 350. With same dimensions, the quarter wave tube sections 302, 304, 306, 313, 315 and 308 may attenuate noise generated by the plenum fan at the same first frequency (e.g., $f_{QWT}$, as described above with reference to FIG. 1). Similarly, the Helmholtz resonator sections 303, 305 and 307, may attenuate noise generated by the plenum fan at the same second frequency (e.g., $f_{HR}$, as described above with reference to FIG. 1).

In another implementation, one or more of the resonator sections 356, 354 and 352 may be sized or configured differently from the resonator section 350, and may be further different from each other in structure and noise attenuation characteristics. For example, the dimensions of the Helmholtz resonator section 309, (may be different from the dimensions of one or more of the Helmholtz resonator sections 303, 305 and 307. The Helmholtz resonator section 303 of the resonator section 356 may attenuate noise at a different frequency than one or more of the Helmholtz resonator sections 309, 305 and 307. Further, dimensions of the quarter wave tube section 317 (e.g., length, width, as described above) may be different from the dimensions of one or more of the quarter wave tube sections 302, 304, 306, 311, 313, 315 and 308. For example, the quarter wave tube section 302 of the resonator section 356 may attenuate noise at a different frequency than one or more of the quarter wave tube sections 304, 306, 311, 313, 315, 308 and 317. The dimensions of the Helmholtz resonator sections 303, 305, 307 and 309, and the quarter wave tube sections 311, 317; 302, 304; 306, 313; 315, 308, in the resonator sections 350, 356, 354, and 352, respectively may be chosen based on desired noise attenuation characteristics (e.g., a number of different noise frequencies, or a range of noise frequencies to be attenuated) of the noise suppression apparatus 300.

Figure 4B:
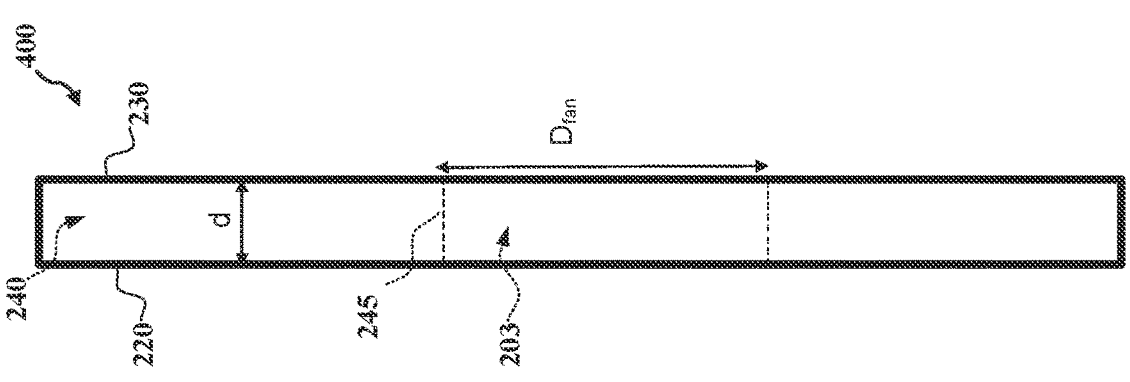
FIGS. 4A and 4B are a front view and a side view, respectively, of an example implementation of a noise suppression apparatus for an AHU, where a forward wall in the front view is removed to expose the internal structure.
Figure 4A:
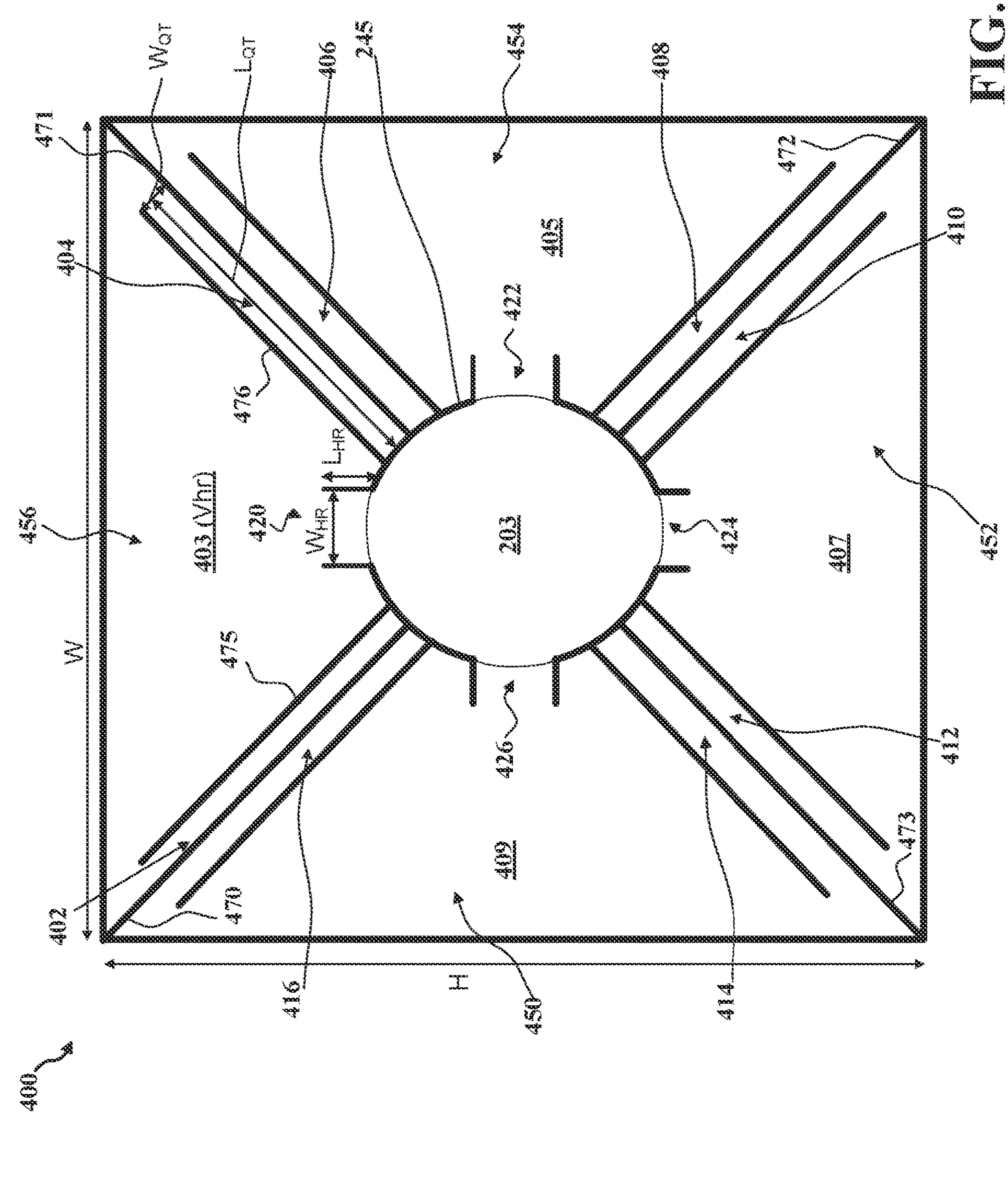

Referring to FIGS. 4A and 4B, an example noise suppression apparatus 400 (i.e., the inlet silencer 138 as described above in FIG. 1) for the AHU 100 includes a plurality of resonator sections that each include a combination of a Helmholtz resonator and at least two quarter wave tube resonators that share a common opening to an inlet air opening 203 that extends through the noise suppression apparatus 400. In an implementation, in one or more of the resonator sections, a quarter wave tube is positioned along each side of the Helmholtz resonator and each have openings to the Helmholtz resonator on an end of the Helmholtz resonator opposite the inlet air opening 203. The noise suppression apparatus 400 may have dimensions, H×W×d (as described above with reference to FIGS. 2A and 2B).

The noise suppression apparatus 400 may include the forward wall 220 spaced apart from the aft wall 230 to define an internal chamber 240 having a plurality of resonator sections. For example, in one implementation, the internal chamber 240 includes resonator sections 450, 452, 454 and 456. The noise suppression apparatus 400 may also include the inlet wall 245 and the aft wall 230 which define the inlet air opening 203 through the noise suppression apparatus 400. The inlet air opening 203 may be circular in cross-section and may be configured to receive air for the plenum fan. The inlet air opening 203 may have a diameter of $D_{fan}$ (e.g., in meters), where $D_{fan}$ may also represent an inlet diameter of the plenum fan. The noise suppression apparatus 400 may also include a plurality of internal walls in the inlet wall 245 defining a plurality of resonator openings. For example, in an implementation, the noise suppression apparatus 400 may include resonator openings 420, 422, 424 and 426. Also, a plurality of side-walls 470, 471, 472 and 473 extending between the forward wall 220 and the aft wall 230 may further define the resonator sections 456, 454, 452 and 450 with resonator openings 420, 422, 424 and 426 centered between each pair of the side-walls. The resonator openings 420, 422, 424 and 426 may open into the resonator sections 456, 454, 452 and 450, respectively.

As an example, the resonator section 456 may include quarter wave tube sections 402 and 404, which together constitute a first sub-section of the resonator section 456. The resonator section 456 may also include a Helmholtz resonator section 403 (with a volume Vhr), immediately adjacent to the resonator opening 420, which constitutes a second sub-section of the resonator section 456. The quarter wave tube sections 402 and 404 may be formed along opposing sides of the Helmholtz resonator section 403 and in communication with the Helmholtz resonator 403. The first sub-section and the second sub-section of the resonator section 456 may be separated by subsection walls 475 and 476. For example, the subsection wall 475 separates the quarter wave tube section 402 from the Helmholtz resonator section 403, and the subsection wall 476 separates the quarter wave tube section 404 from the Helmholtz resonator section 403. The subsection walls 475 and 476 define inlets for the corresponding quarter wave tube sections 402 and 404, respectively, at an end of the resonator section 456 opposite to the resonator opening 420. The inlets for the quarter wave tube sections 402 and 404 open into the Helmholtz resonator section 403.

The resonator opening 420 may open into the Helmholtz resonator section 403. Further, the resonator opening 420 may open into the quarter wave tube sections 402 and 404 through the Helmholtz resonator section 403 (as discussed above through the respective inlets for the quarter wave tube sections 402 and 404). The resonator opening 420 may have an area, $A_{HR}=W_{HR}*d_{HR}$; where, $W_{HR}$ may be the width of the resonator opening 420, and dim may the depth of the resonator opening 420. Also the resonator opening 420 may have a length $L_{HR}$. The second sub-section including the Helmholtz resonator section 403 may attenuate noise generated by the plenum fan at a second frequency ($f_{HR}$, as described above with corresponding formulas in FIG. 1 description). The first sub-section including the quarter wave tube sections 402 and 404, with each of the quarter wave tube sections 402 and 404 having a length, $L_{QT}$, and a width, $W_{QT}$, may attenuate noise generated by the plenum fan at a first frequency ($f_{QWT}$, as described above with corresponding formulas in FIG. 1 description).

Similar to the resonator section 456, the resonator section 454 may include a quarter wave tube section 406, a quarter wave tube section 408, and a Helmholtz resonator section 405 immediately adjacent to the resonator opening 422. The resonator opening 422 may open into the Helmholtz resonator section 405, and through the Helmholtz resonator section 405 into the quarter wave tube sections 406 and 408. Further, the resonator section 452 may include a quarter wave tube section 410, a quarter wave tube section 412, and a Helmholtz resonator section 407 immediately adjacent to the resonator opening 424. The resonator opening 424 may open into the Helmholtz resonator section 407, and through the Helmholtz resonator section 407 into the quarter wave tube sections 410 and 412. Also, similar to the resonator section 456, the resonator section 450 may include a quarter wave tube section 414, a quarter wave tube section 416 and a Helmholtz resonator section 409 immediately adjacent to the resonator opening 426. The resonator opening 426 may open into the Helmholtz resonator section 409, and through the Helmholtz resonator section 407 into the quarter wave tube sections 414 and 416. For simplification, the subsection walls in the resonator sections 454, 452 and 450 are not referenced, and a first sub-section and a second subsection of the resonator sections 454, 452 and 450, are not discussed. However, it is understood that the sub-section walls, the first sub-section and the second sub-section of the resonator sections 454, 452 and 450 may be similar to the sub-section walls 475, 476 and the first sub-section and the second sub-section of the resonator section 456.

In one implementation, the dimensions of the Helmholtz resonator sections 405, 407 and 409 in the respective resonator sections 454, 452 and 450 may be the same as the dimensions of the Helmholtz resonator section 403 in the resonator section 456. Also, the dimensions (e.g., length and width) of the quarter wave tube section 404 ($L_{QT}$ and $W_{QT}$ as described above) may be the same as the dimensions of the quarter wave tube sections 406, 408; 410, 412; 414, 416 in the respective resonator sections 454, 452 and 450. With same dimensions, the quarter wave tube sections 406, 408, 410, 412, 414 and 416 may attenuate noise generated by the plenum fan at the same first frequency (e.g., $f_{QWT}$, as described above with reference to FIG. 1). Similarly, the Helmholtz resonator sections 405, 407 and 409, may attenuate noise generated by the plenum fan at the same second frequency (e.g., $f_{HR}$, as described above with reference to FIG. 1).

In another implementation, one or more of the resonator sections 454, 452 and 450 may be sized or configured differently from the resonator section 456, and may be further different from each other in structure and noise attenuation characteristics. For example, the dimensions of the Helmholtz resonator section 403, may be different from the dimensions of one or more of the Helmholtz resonator sections 405, 407 and 409. The Helmholtz resonator section 403 of the resonator section 456 may attenuate noise at a different frequency than one or more of the Helmholtz resonator sections 405, 407 and 409. Further, dimensions of the quarter wave tube section 404 (e.g., length, width, as described above) may be different from the dimensions of one or more of the quarter wave tube sections 402, 406, 408, 410, 412, 414 and 416. For example, the quarter wave tube section 402 of the resonator section 456 may attenuate noise at a different frequency than one or more of the quarter wave tube sections 404, 406, 408, 410, 412, 414 and 416. The dimensions of the Helmholtz resonator sections 403, 405, 407 and 409, and the quarter wave tube sections 402, 404; 406, 408; 410, 412; 414, 416, in the resonator sections 456, 454, 452 and 450, respectively, may be chosen based on desired noise attenuation characteristics (e.g., a number of different noise frequencies, or a range of noise frequencies to be attenuated) of the noise suppression apparatus 400.

Figure 5B:
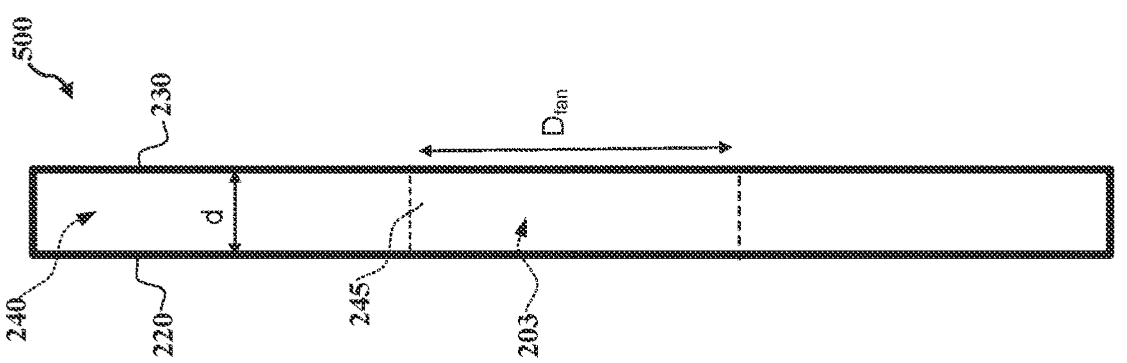
FIGS. 5A and 5B are a front view and a side view, respectively, of an example implementation of a noise suppression apparatus for an AHU, where a forward wall in the front view is removed to expose the internal structure.
Figure 5A:
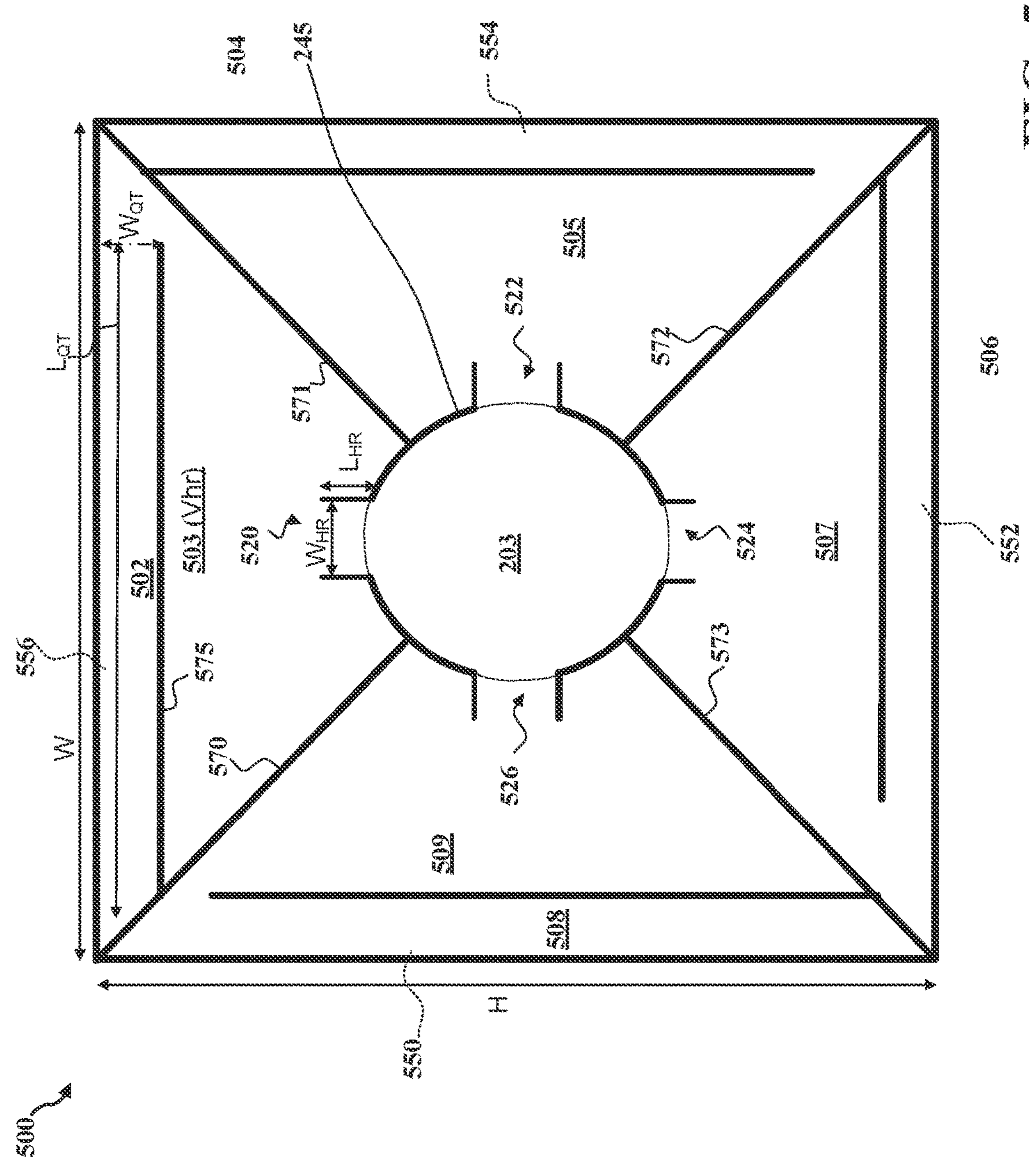

Referring to FIGS. 5A and 5B, an example noise suppression apparatus 500 (i.e., the inlet silencer 138 as described above in FIG. 1) for the AHU 100 includes a plurality of resonator sections that each include a combination of a Helmholtz resonator and a quarter wave tube resonator that share a common opening to an inlet air opening 203 that extends through the noise suppression apparatus 400. In an implementation, one or more resonator sections include a quarter wave tube positioned at an end of the Helmholtz resonator opposite the inlet air opening 203. The noise suppression apparatus 500 may have dimensions, H×W×d (as described above with reference to FIGS. 2A and 2B).

The noise suppression apparatus 500 may include the forward wall 220 spaced apart from the aft wall 230 to define an internal chamber 240. The internal chamber 240 includes a plurality of resonator sections, such as resonator sections 550, 552, 554 and 556. The noise suppression apparatus 500 may also include the inlet wall 245 and the aft wall 230 which define the inlet air opening 203 through the noise suppression apparatus 500. The inlet air opening 203 may be circular in cross-section and may be configured to receive air for the plenum fan. The inlet air opening 203 may have a diameter of $D_{fan}$ (e.g., in meters), where $D_{fan}$ may also represent an inlet diameter of the plenum fan. The noise suppression apparatus 500 may also include a plurality of internal walls in the inlet wall 245 defining a plurality of resonator openings 520, 522, 524 and 526. Also, a plurality of side-walls 570, 571, 572 and 573 extending between the forward wall 220 and the aft wall 230 may further define the resonator sections 556, 554, 552 and 550 with resonator openings 520, 522, 524 and 526 centered between the respective side-walls. The resonator openings 520, 522, 524 and 526 may open into the resonator sections 556, 554, 552 and 550, respectively.

As an example, the resonator section 556 may include a quarter wave tube section 502, which may constitute a first sub-section of the resonator section 556. The resonator section 556 may also include a Helmholtz resonator section 503 (with a volume Vhr), immediately adjacent to the resonator opening 520, which may constitute a second sub-section of the resonator section 556. The quarter wave tube section 502 may be formed in communication with the Helmholtz resonator 403 and formed opposite to the resonator opening 520. The first sub-section and the second sub-section of the resonator section 556 may be separated by a subsection wall 575. For example, the subsection wall 575 separates the quarter wave tube section 502 from the Helmholtz resonator section 503. The subsection wall 575 defines an inlet for the corresponding quarter wave tube section 502 at an end of the resonator section 556 opposite to the resonator opening 520. The inlet for the quarter wave tube section 502 may open into the Helmholtz resonator section 503.

The resonator opening 520 may open into the Helmholtz resonator section 503. Further, the resonator opening 520 may open into the quarter wave tube sections 502 and 504 through the Helmholtz resonator section 503 (as discussed above through the inlet for the quarter wave tube section 502). The resonator opening 520 may have an area, $A_{HR}=W_{HR}*d_{HR}$; where, $W_{HR}$ may be the width of the resonator opening 520, and $d_{HR}$ may the depth of the resonator opening 520. Also the resonator opening 520 may have a length $L_{HR}$. The second sub-section including the Helmholtz resonator section 503 may attenuate noise generated by the plenum fan at a second frequency ($f_{HR}$, as described above with corresponding formulas in FIG. 1 description). The first sub-section including the quarter wave tube section 502 having a length, $L_{QT}$, and a width, $W_{QT}$, may attenuate noise generated by the plenum fan at a first frequency ($f_{QWT}$, as described above with corresponding formulas in FIG. 1 description).

Similar to the resonator section 556, the resonator section 554 may include a quarter wave tube section 504 and a Helmholtz resonator section 505 immediately adjacent to the resonator opening 522. The resonator opening 522 may open into the Helmholtz resonator section 505, and through the Helmholtz resonator section 505 into the quarter wave tube sections 504. Further, the resonator section 552 may include a quarter wave tube section 506 and a Helmholtz resonator section 507 immediately adjacent to the resonator opening 524. The resonator opening 524 may open into the Helmholtz resonator section 507, and through the Helmholtz resonator section 507 into the quarter wave tube sections 506. Also, similar to the resonator section 556, the resonator section 550 may include a quarter wave tube section 508 and a Helmholtz resonator section 509 immediately adjacent to the resonator opening 526. The resonator opening 526 may open into the Helmholtz resonator section 509, and through the Helmholtz resonator section 507 into the quarter wave tube section 508. For simplification, the sub-section walls in the resonator sections 554, 552 and 550 are not shown, and a first sub-section and a second sub-section of the resonator sections 554, 552 and 550, are not discussed. However, it is understood that the sub-section walls, the first sub-section and the second sub-section of the resonator sections 554, 552 and 550 may be similar to the sub-section wall 575, the first sub-section and the second sub-section of the resonator section 556.

In one implementation, the dimensions of the Helmholtz resonator sections 505, 507 and 509 in the respective resonator sections 554, 552 and 550 may be the same as the dimensions of the Helmholtz resonator section 503 in the resonator section 556. Also, the dimensions (e.g., length and width) of the quarter wave tube section 502 ($L_{QT}$ and $W_{QT}$ as described above) may be the same as the dimensions of the quarter wave tube sections 504, 506, and 508 in the respective resonator sections 554, 552 and 550. With same dimensions, the quarter wave tube sections 504, 506 and 508 may attenuate noise generated by the plenum fan at the same first frequency (e.g., $f_{QWT}$, as described above with reference to FIG. 1). Similarly, the Helmholtz resonator sections 505, 507 and 509, may attenuate noise generated by the plenum fan at the same second frequency (e.g., $f_{HR}$, as described above with reference to FIG. 1).

In another implementation, one or more of the resonator sections 554, 552 and 550 may be sized or configured differently from the resonator section 556, and may be further different from each other in structure and noise attenuation characteristics. For example, the dimensions of the Helmholtz resonator section 503, may be different from the dimensions of one or more of the Helmholtz resonator sections 505, 507 and 509. The Helmholtz resonator section 503 of the resonator section 556 may attenuate noise at a different frequency than one or more of the Helmholtz resonator sections 505, 507 and 509. Further, dimensions of the quarter wave tube section 504 (e.g., length, width, as described above) may be different from the dimensions of one or more of the quarter wave tube sections 502, 506 and 508. For example, the quarter wave tube section 502 of the resonator section 556 may attenuate noise at a different frequency than one or more of the quarter wave tube sections 504, 506 and 508. The dimensions of the Helmholtz resonator sections 503, 505, 507 and 509, and the quarter wave tube sections 502, 504; 506, 508, in the resonator sections 556, 554, 552 and 550, respectively may be chosen based on desired noise attenuation characteristics (e.g., a number of different noise frequencies, or a range of noise frequencies to be attenuated) of the noise suppression apparatus 500.

Figure 6B:
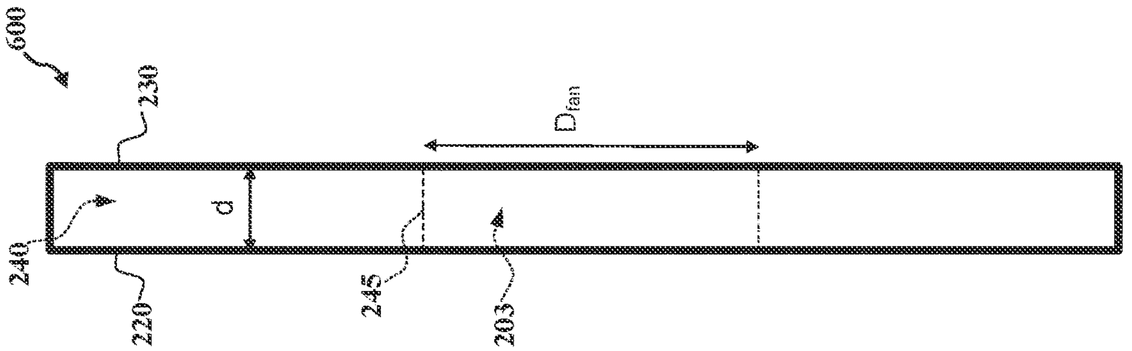
FIGS. 6A and 6B are a front view and a side view, respectively, of an example implementation of a noise suppression apparatus for an AHU, where a forward wall in the front view is removed to expose the internal structure.
Figure 6A:
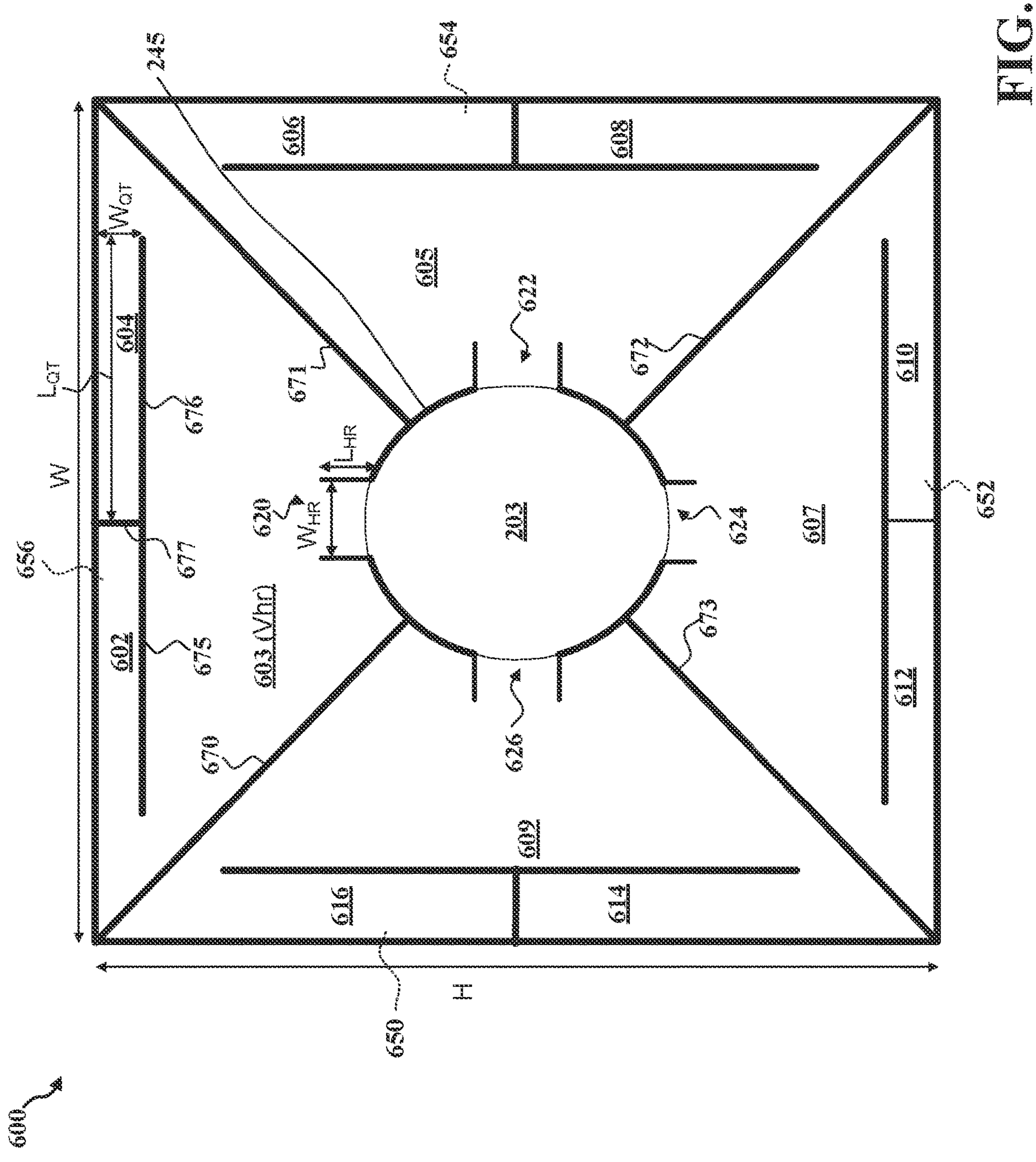

Referring to FIGS. 6A and 6B, an example noise suppression apparatus 600 (i.e., the inlet silencer 138 as described above in FIG. 1) for the AHU 100 includes a plurality of resonator sections that each include a combination of a Helmholtz resonator and at least two quarter wave tube resonators that share a common opening to an inlet air opening 203 that extends through the noise suppression apparatus 600. In an implementation, one or more resonator sections includes two quarter wave tubes, sharing a common dividing wall, positioned at an end of the Helmholtz resonator opposite the inlet air opening 203. The noise suppression apparatus 600 may have dimensions, H×W×d (as described above with reference to FIGS. 2A and 2B).

The noise suppression apparatus 600 may include the forward wall 220 spaced apart from the aft wall 230 to define an internal chamber 240. The internal chamber 240 includes a plurality of resonator sections, such as resonator sections 650, 652, 654 and 656. The noise suppression apparatus 600 may also include the inlet wall 245 and the aft wall 230 which define the inlet air opening 203 (as described above with reference to FIG. 2A) through the noise suppression apparatus 600. The inlet air opening 203 may be circular in cross-section and may be configured to receive air for the plenum fan. The inlet air opening 203 may have a diameter of $D_{fan}$ (e.g., in meters), where $D_{fan}$ may also represent an inlet diameter of the plenum fan. The noise suppression apparatus 600 may also include a plurality of internal walls in the inlet wall 245 defining a plurality of resonator openings 620, 622, 624 and 626. Also, a plurality of sidewalls 670, 671, 672 and 673 extending between the forward wall 220 and the aft wall 230 may further define the resonator sections 656, 654, 652 and 650 with resonator openings 620, 622, 624 and 626 centered between the respective side-walls. The resonator openings 620, 622, 624 and 626 may open into the resonator sections 656, 654, 652 and 650, respectively.

As an example, the resonator section 656 may include quarter wave tube sections 602 and 604, which may together constitute a first sub-section of the resonator section 656. The resonator section 656 may include a Helmholtz resonator section 603 (with a volume Vhr) immediately adjacent to the resonator opening 620 which may constitute a second sub-section of the resonator section 656. The quarter wave tube sections 602 and 604 may be formed opposite to the resonator opening 620 and in communication with the Helmholtz resonator 603. The first sub-section and the second sub-section of the resonator section 656 may be separated by subsection walls 675 and 676. For example, the subsection wall 675 separates the quarter wave tube section 602 from the Helmholtz resonator section 603, and the subsection wall 676 separates the quarter wave tube section 604 from the Helmholtz resonator section 603. The subsection wall 675 and the second subsection wall 676 may be separated by a separating wall 677. The separating wall 677 may extend between the forward wall 220 and the aft wall 230. The subsection wall 675 and the second subsection wall 676 may be formed opposite to the resonator opening 620. The subsection walls 675 and 676 may define inlets for the corresponding quarter wave tube sections 602 and 604, respectively, at an end of the resonator section 656 opposite to the resonator opening 620. The inlets for the quarter wave tube sections 602 and 604 may be positioned opposite to the separating wall 677 and may open into the Helmholtz resonator section 603.

The resonator opening 620 may open into the Helmholtz resonator section 603. Further, the resonator opening 620 may open into the quarter wave tube sections 602 and 604 through the Helmholtz resonator section 603 (as discussed above through the respective inlets for the quarter wave tube sections 602 and 604). The resonator opening 620 may have an area, $A_{HR}=W_{HR}*d_{HR}$; where, $W_{HR}$ may be the width of the resonator opening 620, and dim may the depth of the resonator opening 620. Also the resonator opening 620 may have a length $L_{HR}$. The second sub-section including the Helmholtz resonator section 603 may attenuate noise generated by the plenum fan at a second frequency ($f_{HR}$, as described above with corresponding formulas in FIG. 1 description). The first sub-section including the quarter wave tube sections 602 and 604, with each of the quarter wave tube sections 602 and 604 having a length, $L_{QT}$, and a width, $W_{QT}$, may attenuate noise generated by the plenum fan at a first frequency ($f_{QWT}$, as described above with corresponding formulas in FIG. 1 description).

Similar to the resonator section 656, the resonator section 654 may include a quarter wave tube section 606, a quarter wave tube section 608, and a Helmholtz resonator section 605 immediately adjacent to the resonator opening 622. The resonator opening 622 may open into the Helmholtz resonator section 605, and through the Helmholtz resonator section 605 into the quarter wave tube sections 606 and 608. Further, the resonator section 652 may include a quarter wave tube section 610, a quarter wave tube section 612, and a Helmholtz resonator section 607 immediately adjacent to the resonator opening 624. The resonator opening 624 may open into the Helmholtz resonator section 607, and through the Helmholtz resonator section 607 into the quarter wave tube sections 610 and 612. Also, similar to the resonator section 656, the resonator section 650 may include a quarter wave tube section 614, a quarter wave tube section 616 and a Helmholtz resonator section 609 immediately adjacent to the resonator opening 626. The resonator opening 626 may open into the Helmholtz resonator section 609, and through the Helmholtz resonator section 607 into the quarter wave tube sections 614 and 616. For simplification, the subsection walls and a separating wall in the resonator sections 654, 652 and 650 are not shown, and a first sub-section and a second sub-section of the resonator sections 654, 652 and 650, are not discussed. However, it is understood that the sub-section walls, the separating wall, the first sub-section and the second sub-section of the resonator sections 654, 652 and 650 may be similar to the sub-section walls 675 and 676, the separating wall 677, the first sub-section and the second sub-section of the resonator section 656.

In one implementation, the dimensions of the Helmholtz resonator sections 605, 607 and 609 in the respective resonator sections 654, 652 and 650 may be the same as the dimensions of the Helmholtz resonator section 603 in the resonator section 656. Also, the dimensions (e.g., length and width) of the quarter wave tube section 604 ($L_{QT}$ and $W_{QT}$ as described above) may be the same as the dimensions of the quarter wave tube sections 606, 608; 610, 612; 614, 616 in the respective resonator sections 654, 652 and 650. With same dimensions, the quarter wave tube sections 606, 608, 610, 612, 614 and 616 may attenuate noise generated by the plenum fan at the same first frequency (e.g., $f_{QWT}$, as described above with reference to FIG. 1). Similarly, the Helmholtz resonator sections 605, 607 and 609, may attenuate noise generated by the plenum fan at the same second frequency (e.g., $f_{HR}$, as described above with reference to FIG. 1).

In another implementation, one or more of the resonator sections 654, 652 and 650 may be sized or configured differently from the resonator section 656, and may be further different from each other in structure and noise attenuation characteristics. For example, the dimensions of the Helmholtz resonator section 603, may be different from the dimensions of one or more of the Helmholtz resonator sections 605, 607 and 609. The Helmholtz resonator section 603 of the resonator section 656 may attenuate noise at a different frequency than one or more of the Helmholtz resonator sections 605, 607 and 609. Further, dimensions of the quarter wave tube section 604 (e.g., length, width, as described above) may be different from the dimensions of one or more of the quarter wave tube sections 602, 606, 608, 610, 612, 614 and 616. For example, the quarter wave tube section 602 of the resonator section 656 may attenuate noise at a different frequency than one or more of the quarter wave tube sections 604, 606, 608, 610, 612, 614 and 616. The dimensions of the Helmholtz resonator sections 603, 605, 607 and 609, and the quarter wave tube sections 602, 604; 606, 608; 610, 612; 614, 616, in the resonator sections 656, 654, 652 and 650, respectively may be chosen based on desired noise attenuation characteristics (e.g., a number of different noise frequencies, or a range of noise frequencies to be attenuated) of the noise suppression apparatus 600.

The drawing figures depict various and different implementations of the inlet silencer, however the inlet silencer of the present application is not limited to the above described implementations and precise arrangements shown in the figures. The attenuation/suppression characteristics of the inlet silencer of the present application may remain the same irrespective of placement of the inlet silencer with respect to a plenum fan (e.g., before or after the plenum fan with respect to the air flow through the plenum fan, at a side, at the top or at bottom of the plenum fan. Another advantage of the proposed silencer is that return air sound levels may be considerably lower in an AHU system than a system without the inlet silencer of the present application.

The invention claimed is:

1. A noise suppression apparatus for a heating, ventilation, and air conditioning (HVAC) system, comprising:

an internal chamber comprising a plurality of Helmholtz resonators and a plurality of quarter wave tube resonators; and an inlet air opening extending through the noise suppression apparatus, wherein the inlet air opening is fluidly coupled to at least one Helmholtz resonator of the plurality of Helmholtz resonators.

2. The noise suppression apparatus of claim 1, wherein the internal chamber is at least partially defined by a forward wall and an aft wall of the noise suppression apparatus, the noise suppression apparatus comprises an inlet wall extending from the forward wall to the aft wall, and the inlet wall defines the inlet air opening.

3. The noise suppression apparatus of claim 2, wherein the inlet air opening is fluidly coupled to the at least one Helmholtz resonator of the plurality of Helmholtz resonators via at least one resonator opening formed in the inlet wall.

4. The noise suppression apparatus of claim 2, comprising a plurality of side walls extending from the forward wall to the aft wall, wherein the plurality of Helmholtz resonators is partitioned by the plurality of side walls.

5. The noise suppression apparatus of claim 1, wherein the inlet air opening is fluidly coupled to at least one quarter wave tube resonator of the plurality of quarter wave tube resonators.

6. The noise suppression apparatus of claim 5, wherein the internal chamber is at least partially defined by a forward wall and an aft wall of the noise suppression apparatus, the noise suppression apparatus comprises an inlet wall extending from the forward wall to the aft wall, the inlet wall defines the inlet air opening, and the inlet air opening is fluidly coupled to the at least one Helmholtz resonator and the at least one quarter wave tube resonator via a common resonator opening formed in the inlet wall.

7. The noise suppression apparatus of claim 1, wherein the at least one Helmholtz resonator of the plurality of Helmholtz resonators is fluidly coupled to at least one corresponding quarter wave tube resonators of the plurality of quarter wave tube resonators.

8. The noise suppression apparatus of claim 1, wherein the at least one Helmholtz resonator of the plurality of Helmholtz resonators is fluidly coupled to at least two corresponding quarter wave tube resonators of the plurality of quarter wave tube resonators.

9. The noise suppression apparatus of claim 1, comprising an inlet wall extending through the internal chamber, wherein the inlet wall defines the inlet air opening, and at least two quarter wave tube resonators of the plurality of quarter wave tube resonators are fluidly coupled to the inlet air opening via a common resonator opening formed in the inlet wall.

10. The noise suppression apparatus of claim 1, wherein the noise suppression apparatus is configured to be disposed within an air handling unit of the HVAC system, upstream of a fan of the air handling unit, and wherein the plurality of Helmholtz resonators and the plurality of quarter wave tube resonators are configured to attenuate noise generated by the fan at two or more frequencies.

11. The noise suppression apparatus of claim 1, comprising:

an inlet wall extending through the internal chamber, wherein the inlet wall defines the inlet air opening;

a plurality of resonator sections defined within the internal chamber, wherein each resonator section of the plurality of resonator sections comprises a corresponding Helmholtz resonator of the plurality of Helmholtz resonators and at least one corresponding quarter wave tube resonator of the plurality of quarter wave tube resonators; and a plurality of resonator openings formed in the inlet wall, wherein each resonator opening of the plurality of resonator openings fluidly couples the inlet air opening to a corresponding resonator section of the plurality of resonator sections.

12. The noise suppression apparatus of claim 11, wherein each resonator section of the plurality of resonator sections comprises two quarter wave tube resonators formed along opposite sides of the corresponding Helmholtz resonator.

13. A heating, ventilation, and air conditioning (HVAC) system, comprising:

an air handling unit comprising a fan configured to direct an air flow through the air handling unit; and a noise suppression apparatus disposed within the air handling unit and configured to attenuate noise produced by the fan, wherein the noise suppression apparatus comprises:

an internal chamber comprising a plurality of Helmholtz resonators and a plurality of quarter wave tube resonators; and an inlet air opening extending through the noise suppression apparatus, wherein the inlet air opening is fluidly coupled to at least one Helmholtz resonator of the plurality of Helmholtz resonators, and the fan is configured to draw the air flow through the noise suppression apparatus and toward the fan via the inlet air opening.

14. The HVAC system of claim 13, wherein at least one quarter wave tube resonator of the plurality of quarter wave tube resonators is configured to attenuate the noise at a first frequency, and at least one Helmholtz resonator of the plurality of Helmholtz resonators is configured to attenuate the noise at a second frequency different from the first frequency.

15. The HVAC system of claim 13, wherein the noise suppression apparatus comprises an inlet wall extending through internal chamber and defining the inlet air opening, the inlet wall comprises a plurality of resonator openings formed therein, and the plurality of resonator openings fluidly couple the inlet air opening to the plurality of Helmholtz resonators.

16. The HVAC system of claim 13, wherein the noise suppression apparatus comprises an inlet wall extending through the internal chamber and defining the inlet air opening, and the inlet wall comprises:

a first plurality of resonator openings formed therein and fluidly coupling the inlet air opening to the plurality of Helmholtz resonators; and a second plurality of resonator openings formed therein and fluidly coupling the inlet air opening to the plurality of quarter wave tube resonators.

17. The HVAC system of claim 13, wherein a Helmholtz resonator of the plurality of Helmholtz resonators is directly fluidly coupled to at least one quarter wave tube resonator of the plurality of quarter wave tube resonators.

18. An air handling unit for a heating, ventilation, and air conditioning (HVAC) system, comprising:

a fan configured to direct an air flow through the air handling unit; and a noise suppression apparatus coupled to the air handling unit and configured to attenuate noise produced by the fan, wherein the noise suppression apparatus comprises:

an internal chamber comprising a plurality of Helmholtz resonators and a plurality of quarter wave tube resonators; and an inlet air opening extending through the noise suppression apparatus and configured to direct the air flow through the noise suppression apparatus, wherein the inlet air opening opens into at least one Helmholtz resonator of the plurality of Helmholtz resonators, and wherein a Helmholtz resonator of the plurality of Helmholtz resonators is directly fluidly coupled to at least one quarter wave tube resonator of the plurality of quarter wave tube resonators.

19. The air handling unit of claim 18, wherein the noise suppression apparatus comprises:

a forward wall and an aft wall at least partially defining the internal chamber; and an inlet wall extending from the forward wall to the aft wall, wherein the inlet wall defines the inlet air opening, and the inlet air opening opens into the at least one Helmholtz resonator of the plurality of Helmholtz resonators via at least one resonator opening formed in the inlet wall.

20. The air handling unit of claim 18, wherein the fan is configured to draw the air flow through the inlet air opening and toward the fan.

* * * * *